US008176655B2

(12) United States Patent
Gibson

(10) Patent No.: US 8,176,655 B2
(45) Date of Patent: May 15, 2012

(54) VAPOR ATMOSPHERE SPRAY DRYER

(75) Inventor: Stewart Gibson, Barrington, RI (US)

(73) Assignee: SPX Flow Technology Danmark A/S, Silkeborg (DK)

( * ) Notice: Subject to any disclaimer, the term of this patent is extended or adjusted under 35 U.S.C. 154(b) by 753 days.

(21) Appl. No.: 12/336,123

(22) Filed: Dec. 16, 2008

(65) Prior Publication Data

US 2010/0146807 A1 Jun. 17, 2010

(51) Int. Cl.
*F26B 3/12* (2006.01)

(52) U.S. Cl. .................. 34/558; 34/568; 34/82; 34/212; 34/219; 34/372; 34/373

(58) Field of Classification Search .................... 34/262, 34/366, 372, 373, 558, 568, 82, 209, 210, 34/212, 218, 219, 362
See application file for complete search history.

(56) References Cited

U.S. PATENT DOCUMENTS 3,508,339 A 4/1970 Neblett et al.
4,242,808 A 1/1981 Luthi
4,376,010 A 3/1983 Gauvin
4,615,283 A * 10/1986 Ciliberti et al. ............... 588/320
4,809,442 A 3/1989 Iwaya et al.
4,896,436 A 1/1990 Iwaya et al.
5,276,977 A 1/1994 Cysewski
5,291,668 A 3/1994 Becker et al.
5,431,780 A 7/1995 Raehse et al.
5,518,180 A * 5/1996 Svendsen ...................... 239/224
6,085,440 A 7/2000 Getler
6,101,736 A 8/2000 Griffin et al.
6,253,463 B1 7/2001 Hansen
6,256,902 B1 7/2001 Flaherty et al.
6,266,895 B1 7/2001 Jensen
6,308,434 B1 10/2001 Chickering, III et al.
6,451,091 B1 * 9/2002 Avina .............................. 95/107
6,560,897 B2 5/2003 Chickering, III et al.
6,918,991 B2 7/2005 Chickering, III et al.
6,962,006 B2 11/2005 Chickering, III et al.
2009/0020481 A1 * 1/2009 Bailie et al. .................. 210/710

OTHER PUBLICATIONS

Gibson, "An introduction to steam-atmosphere drying," *Powder and Bulk Engineering*, vol. 22, No. 4, Apr. 2008, pp. 33-39.

* cited by examiner

*Primary Examiner* — Jiping Lu
(74) *Attorney, Agent, or Firm* — Baker & Hostetler LLP

(57) ABSTRACT

A vapor atmosphere spray dryer can include a closed-loop circuit having a dryer, a bag house filter system, a fan, and a heater system which are fluidly connected together for circulating a mass of superheated vapor therethrough. A centrifugal atomizer is disposed within the dryer. A feed system delivers a supply of feed slurry to the centrifugal atomizer which discharges a supply of atomized feed slurry in the dryer for combination with the circulated mass of superheated vapor within the dryer. The closed loop circuit is constructed such that the circulated mass of superheated vapor has an operating pressure of at least 1 psi which is generated by the evaporation of the fluid in the atomized feed slurry in the dryer resulting from the combination of the supply of atomized feed slurry and the circulated mass of superheated vapor.

16 Claims, 7 Drawing Sheets

VAPOR ATMOSPHERE SPRAY DRYER

FIELD OF THE INVENTION

The present invention relates generally to a vapor atmosphere dryer and, more particularly, to a vapor atmosphere spray dryer including a closed-loop circuit having a dryer, a bag house filter system, a fan, and a heater system for drying aqueous solutions, slurries, or solid suspensions of materials, for example.

BACKGROUND OF THE INVENTION

There are several known methods for drying aqueous solutions, slurries, solid suspensions of materials, and the like. Such known methods include convection drying, spray drying, and superheated steam drying, for example.

Spray drying is a common processing operation whereby solids dissolved in an aqueous solution or present in the form of a slurry, for example, are dried to a finely divided powdery product. Conventionally, the process includes atomizing the solution or slurry in the form of finely divided droplets which are then evaporated and dried in contact with a current of hot air at elevated temperature which acts as the drying medium.

In convection drying, heated air flows through the dryer to contact the wet feed. The water from the feed evaporates into the air, which cools the air while increasing its humidity. After the dried product, typically a powder, is separated from the air, the moist air is exhausted to the atmosphere along with some of the energy used during drying.

The convection dryer's efficiency can be improved by recycling some of the moist exhaust air together with its energy (in the form of waste heat) back to the dryer inlet. Recycling the exhaust air increases the humidity in the dryer which, in turn, requires a higher operating temperature and results in a higher final product temperature than in a completely open-circuit convection-drying operation.

Some of the convection waste heat can be recovered by passing the hot exhaust air through a heat-recovery system to warm the dryer's fresh makeup air. The heat-recovery system can be an indirect system, such as an air-to-air heat exchanger with a coil system with two recirculating, fluid-filled coils that transfer heat to the makeup air passing between them. The heat-recovery system can also be a direct system in which the makeup air is passed through a scrubber system that sprays with hot water condensed from the dryer's re-circulated exhaust air. This water can run very closely to the exhaust air's saturation temperature (the dew point), which is frequently in the range of 130° F. to 150° F. (55° C. to 65° C.). However, this temperature is limited by the amount of air present in the dryer exhaust: the more air in the exhaust, the lower the saturation temperature.

Superheated steam can be used instead of hot air for drying an aqueous solution or slurry. Steam atmosphere drying recycles the exhaust stream in a closed-circuit operation. Steam-atmosphere drying increases the temperature of the heat recovered from the dryer's exhaust by reducing the amount of non-condensible gases in it. Heat is transferred to the dryer indirectly using a fired heat exchanger, rather than directly. Indirect heat transfer allows the recirculated exhaust stream to be reheated without introducing anymore non-condensible gases. The primary air that originally fills the dryer can be purged and replaced with evaporated vapor, typically steam, to form an atmosphere of superheated vapor, or superheated steam. As with a conventional boiler, the temperature of this vapor, and thus the heat recovery, depends upon the dryer's operating pressure. Accordingly, the steam-atmosphere dryer has a higher operating temperature and a higher product temperature than a typical convection dryer.

SUMMARY OF THE INVENTION

In one embodiment, a vapor atmosphere spray dryer can be provided that has a closed-loop circuit including a dryer, a bag house filter system, a fan, and a heater system that are fluidly connected together to circulate a superheated vapor therethrough. A centrifugal atomizer can be disposed within the dryer. A feed system for delivering a supply of feed slurry to the atomizer can be operably arranged with the centrifugal atomizer to provide a supply of atomized feed slurry for combination with the superheated vapor within the dryer. The closed-loop circuit can be constructed such that the recirculated mass of superheated vapor has an operating pressure of at least one psi that is generated by the evaporation of the fluid in the atomized feed slurry in the dryer resulting from the combination of the supply of atomized feed slurry and the recirculated mass of superheated vapor.

In other embodiments, a vapor atmosphere spray dryer can be provided that includes a closed-loop circuit having a dryer, a bag house filter system, a fan, and a heater system fluidly connected together to circulate a superheated vapor therethrough. A centrifugal atomizer can be disposed within the dryer. A feed system can be operably arranged with the centrifugal atomizer for discharging a supply of atomized feed slurry within the dryer. The dryer can include a superheated vapor inlet, a liquid feed inlet, and a vapor and powder outlet. The bag house filter can include a vapor and powder inlet, a powder outlet for expelling dried product therefrom, and a vapor outlet for expelling pressurized, superheated vapor therefrom. The vapor and powder feed inlet of the bag house filter is fluidly connected to the vapor and powder outlet of the dryer. The dryer can include an enclosure and a drying chamber. The atomizer can be disposed within the enclosure of the dryer and arranged such that the supply of atomized feed slurry is discharged therefrom into the drying chamber. The superheated vapor inlet and the vapor and powder outlet of the dryer are in fluid communication with the drying chamber such that the recirculated mass of superheated vapor circulates through the drying chamber. The enclosure is at a first operating pressure, and the drying chamber is a second operating pressure wherein the first pressure is greater than the second pressure.

In yet other embodiments, a vapor atmosphere spray dryer can be provided that includes a closed-loop circuit having a dryer with an enclosure and a drying chamber, a bag house filter system, a fan, and a heater system that are fluidly connected together for circulating a superheated vapor therethrough that is pressurized to at least 1 psi. A centrifugal atomizer can be provided that includes a motor, a spindle having a longitudinal axis, and a distal end with a distributing wheel. The spindle is rotatable about the longitudinal axis thereof via the motor. The atomizer can include a body having a mounting end and a distal end with the spindle rotatably mounted within the body such that the wheel extends from the distal end of the body. The motor is disposed within the enclosure of the drying chamber. The distributing wheel is disposed within the drying chamber of the dryer. A feed system can be provided that is operably arranged with the centrifugal atomizer to provide a supply of atomized feed slurry within the dryer. The enclosure of the dryer has a first operating pressure, and the drying chamber of the dryer has a second operating pressure wherein the first operating pressure is greater than the second operating pressure.

DETAILED DESCRIPTION OF EMBODIMENTS OF THE INVENTION

Figure 1:
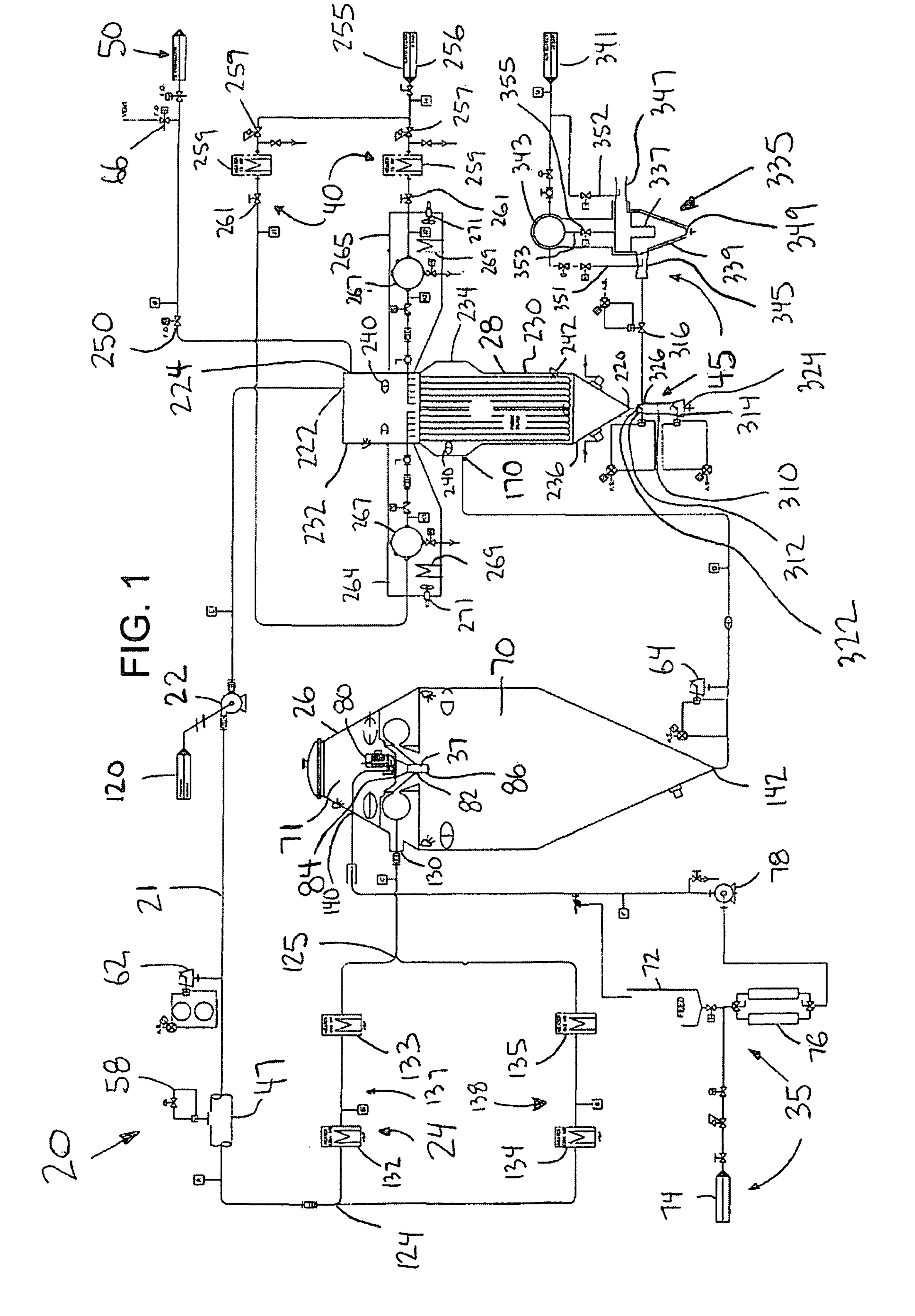
FIG. 1 is a schematic view of an embodiment of a vapor atmosphere spray dryer.

Referring to FIG. 1, an embodiment of a vapor atmosphere spray dryer 20 is shown. The vapor atmosphere spray dryer 20 can include a closed-loop circuit 21 comprising a fan 22, a heater system 24, a dryer 26, and a bag house filter system 28 for circulating a mass of superheated vapor through the closed-loop circuit 21. In some embodiments, the circulated mass of superheated vapor comprises steam.

A feed system 35, including a centrifugal atomizer 37 disposed within the dryer 26, can be provided for delivering a supply of atomized feed slurry for drying in the dryer 26. In the dryer 26, the atomized feed slurry and the superheated vapor interact to cause the liquid in the feed slurry to evaporate and become superheated, thereby increasing the amount of superheated vapor in the closed-loop circuit 21.

The feed particulate can be filtered from the superheated vapor in the bag house filter 28. The bag house filter 28 can include a pulse cleaning system 40 for periodically cleaning the filter bags of the bag house filter 28. A powder discharge system 45 can be provided for handling the dried powder from the bag house filter. The superheated vapor can discharge from the bag house filter 28 to the fan 22 to re-circulate through the closed-loop circuit 21.

Figure 2:
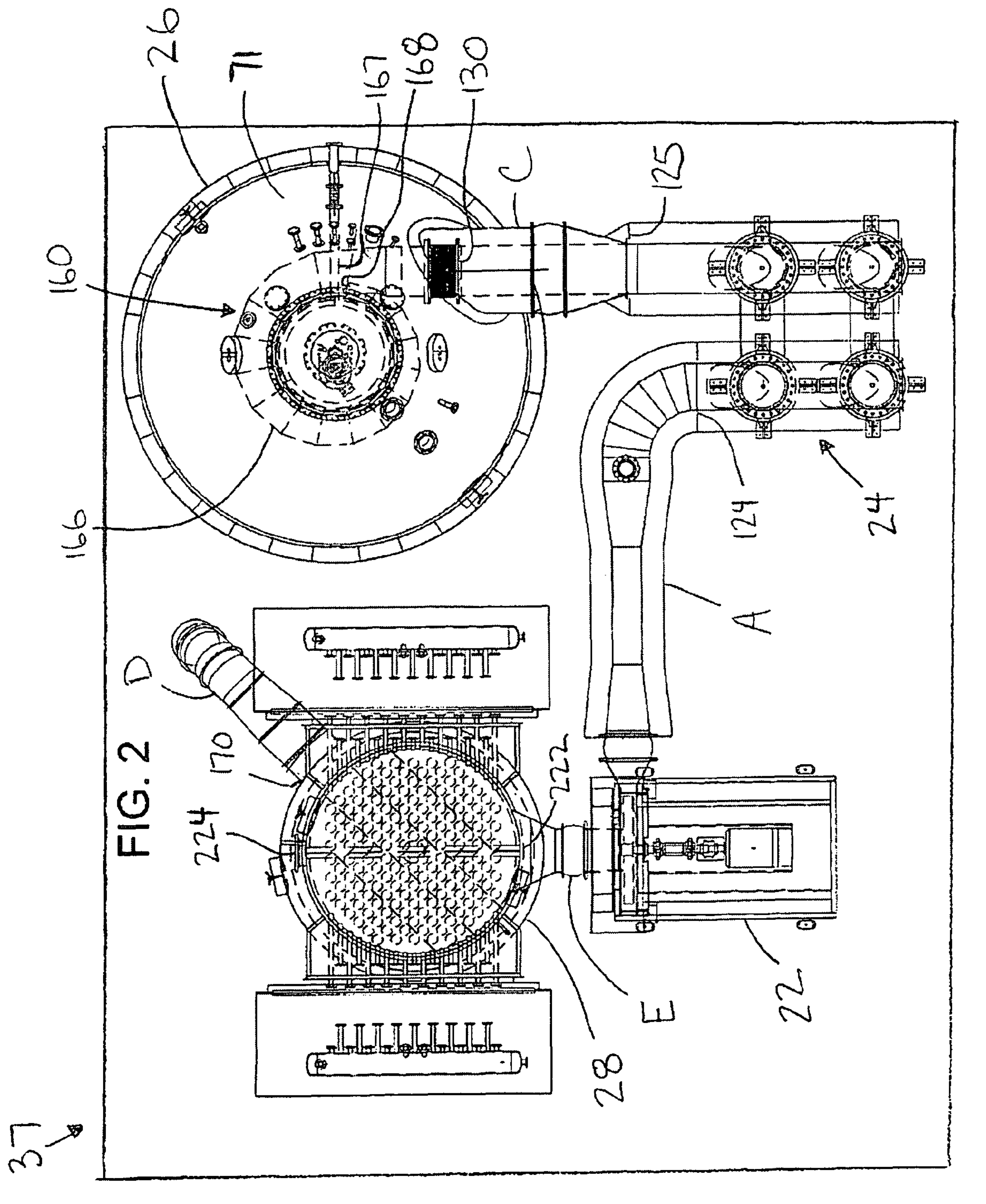
FIG. 2 is a partial plan view of the vapor atmosphere spray dryer of FIG. 1.

Referring to FIGS. 1 and 2, the closed-loop 21 can include suitable piping 47 connecting the fan 22, the heater system 24, the dryer 26, and the bag house filter 28. The piping 47 can include lengths of conduit A, B, C, D, E with sections coupled together with expansion-joint fittings to allow the equipment and piping 47 to expand and contract. Each expansion joint can offer two-degrees of movement. The fan 22, the heater system 24, the dryer 26, and the bag house filter system 28 are fluidly connected together for circulating a mass of superheated vapor through the closed-loop circuit 21. When the steam atmosphere spray dryer 20 is operating under steady state conditions, pressurized superheated vapor can circulate through the closed-loop circuit 21 from the fan 22 to the heater system 24 to the dryer 26 to the bag house filter 28 and back to the fan 22.

The closed-loop circuit 21 can be constructed such that the circulated mass of superheated vapor has an operating pressure of at least 1 psi. The operating pressure of the recirculated mass of superheated vapor can be generated by the evaporation of the fluid in the atomized feed slurry in the dryer resulting from the combination of the supply of atomized feed slurry and the circulated mass of superheated vapor within the drying chamber. In some embodiments, the recirculated mass of superheated vapor is pressurized to an operating range between about 2 psi and 20 psi. To maintain the pressure within the closed-loop circuit 21 at a predetermined level, a portion of the superheated vapor can be diverted from the closed-loop circuit 21 to a secondary component 50 which uses a condensing, heat transfer step, such as an evaporator, for example.

A pressure and vacuum relief valve 58 can be provided to help relieve excess pressure developed within the closed-loop circuit 21 and to help prevent an excessive vacuum forming within the closed-loop circuit 21. The pressure and vacuum relief valve 58 can comprise a pilot-operated, diaphragm-operated valve.

The pressure and vacuum relief valve 58 can open if the pressure within the closed-loop circuit 21 exceeds a predetermined amount. For example, in embodiments where the target operating pressure is 12 psi, the pressure and vacuum relief valve 58 can open if the pressure within the closed-loop circuit 21 exceeds 12.5 psi. In such a situation, the superheated vapor in the closed-loop circuit 21 can be vented to atmosphere via the pressure and vacuum relief valve 58 to relieve pressure in the closed-loop circuit 21. Once pressure is reduced to the predetermined level, the pressure and vacuum relief valve 58 can close.

The pressure and vacuum relief valve 58 can also open if the pressure within the closed-loop circuit 21 falls below a predetermined, negative pressure. For example, in some embodiments, the pressure and vacuum relief valve 58 can open if the pressure within the closed-loop circuit 21 is below −0.5 psi. In such a situation, atmospheric air can enter the circuit 21 to increase pressure in the closed-loop circuit 21. Once pressure is increased to the predetermined level, the pressure and vacuum relief valve 58 can close.

A plurality of vent valves 62, 64, 66 can be provided in the closed-loop circuit 21 and in the conduit G leading to the secondary user 50 to help vent and drain the system in the event of a power failure or a planned shutdown of the system. One of the vent valves 64 can be operably arranged with the outlet of the dryer 26 to facilitate the draining of the system. The vent valves 62, 64, 66 can be normally-open valves that return to an open position in the event of a power failure. The pressure and vacuum relief valve 58 and the vent valves 62, 64, 66 can have heat tracing applied thereto to help prevent condensation.

Referring to FIG. 1, the feed system 35 can provide a supply of atomized feed slurry for combination with the circulated mass of superheated vapor within a drying chamber 70 of the dryer 26. The feed system 35 can include a feed tank 72 for storing a supply of feed, a water supply 74, a filter system 76, the water supply 74 connected in parallel with the feed tank 72 to the filter system 76, a pump 78 downstream of the filter system 76 for conveying the feed slurry to the dryer 26, and the centrifugal atomizer 37. Water, or feed in the form of a solution or a slurry, is pumped to the atomizer 37. The centrifugal atomizer 37 is disposed within the dryer 26 and can discharge a supply of atomized feed slurry within the dryer 26.

The feed can be any suitable feed, such as any material that can be carried in suspension in a liquid that is capable of evaporating. Examples of suitable feed include, silica, starch, titanium dioxide, and cellulose, for example.

Referring to FIG. 1, the centrifugal atomizer 37 can include a motor 80 and a body 82. The motor 80 is disposed within a pressurized enclosure 71 of the dryer 26. The body 82 has a mounting end 84 and a distal end 86. The body 82 is disposed within the pressurized enclosure 71 such that the distal end 86 of the body 82 extends a predetermined distance into the drying chamber 70.

Figure 5:
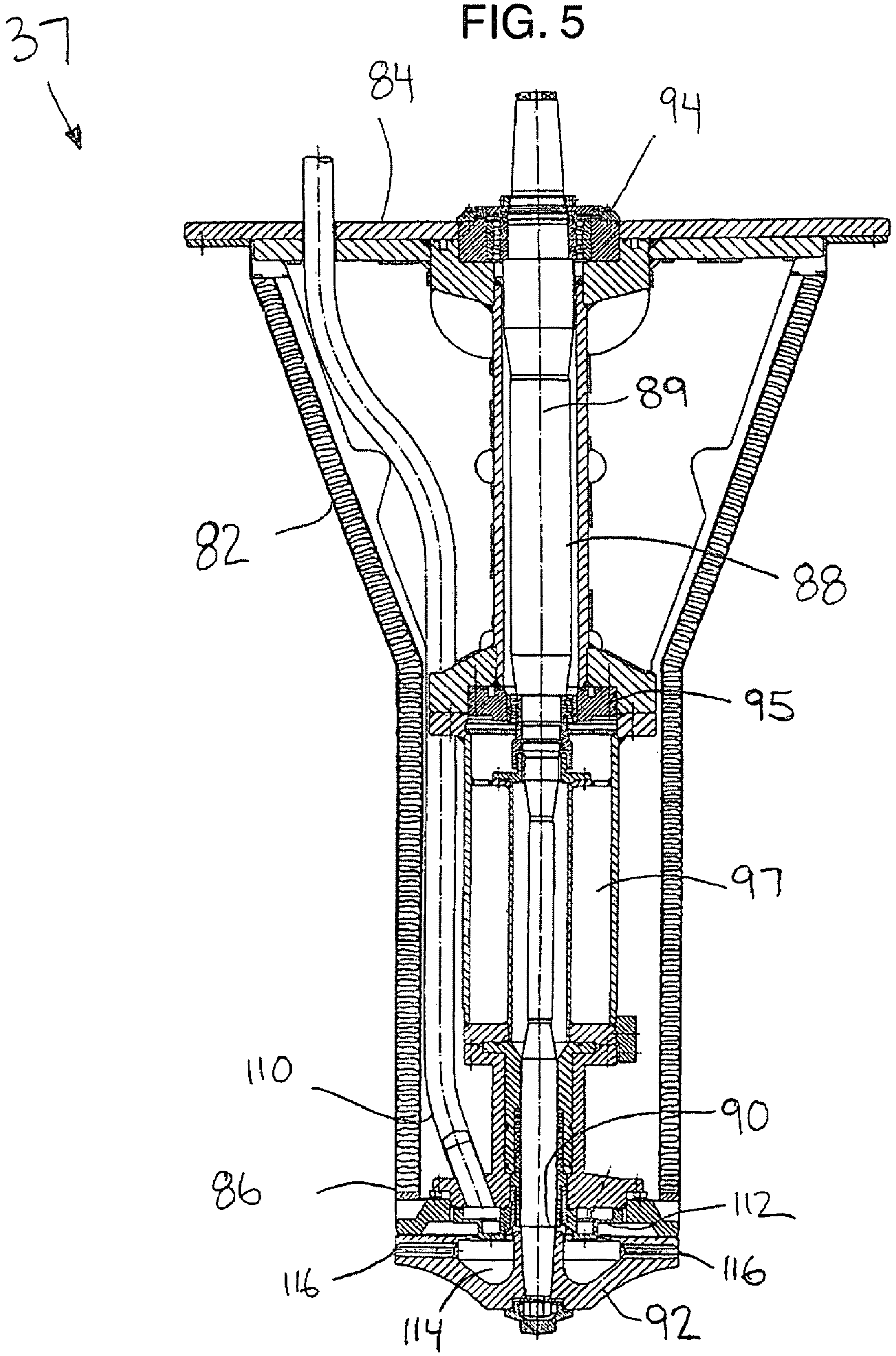
FIG. 5 is an elevational view, in section, of a centrifugal atomizer suitable for use with the vapor atmosphere spray dryer of FIG. 1.

Referring to FIG. 5, the body 82 of the centrifugal atomizer 37 supports a spindle 88 having a longitudinal axis 89 and a distal end 90 with a distributing wheel 92. The spindle 88 is rotatable about its longitudinal axis 89 via the motor. The spindle 88 is rotatably mounted within the body 82 such that the wheel 92 extends from the distal end 86 of the body 82 within the drying chamber of the dryer. The spindle 88 can rotate at any suitable speed, such as between 2,000 and 60,000 rpm, for example, and typically between about 5,000 and 15,000 rpm. The components of the atomizer 37 can be sized for the particular density of the feed slurry to be dried in the steam atmosphere spray dryer 20.

Referring to FIG. 5, the atomizer 37 can include a plurality of oil-lubricated bearings 94, 95 to allow the spindle 88 to rotate. A sump 97 is provided for the collection of lubrication oil.

Figure 4:
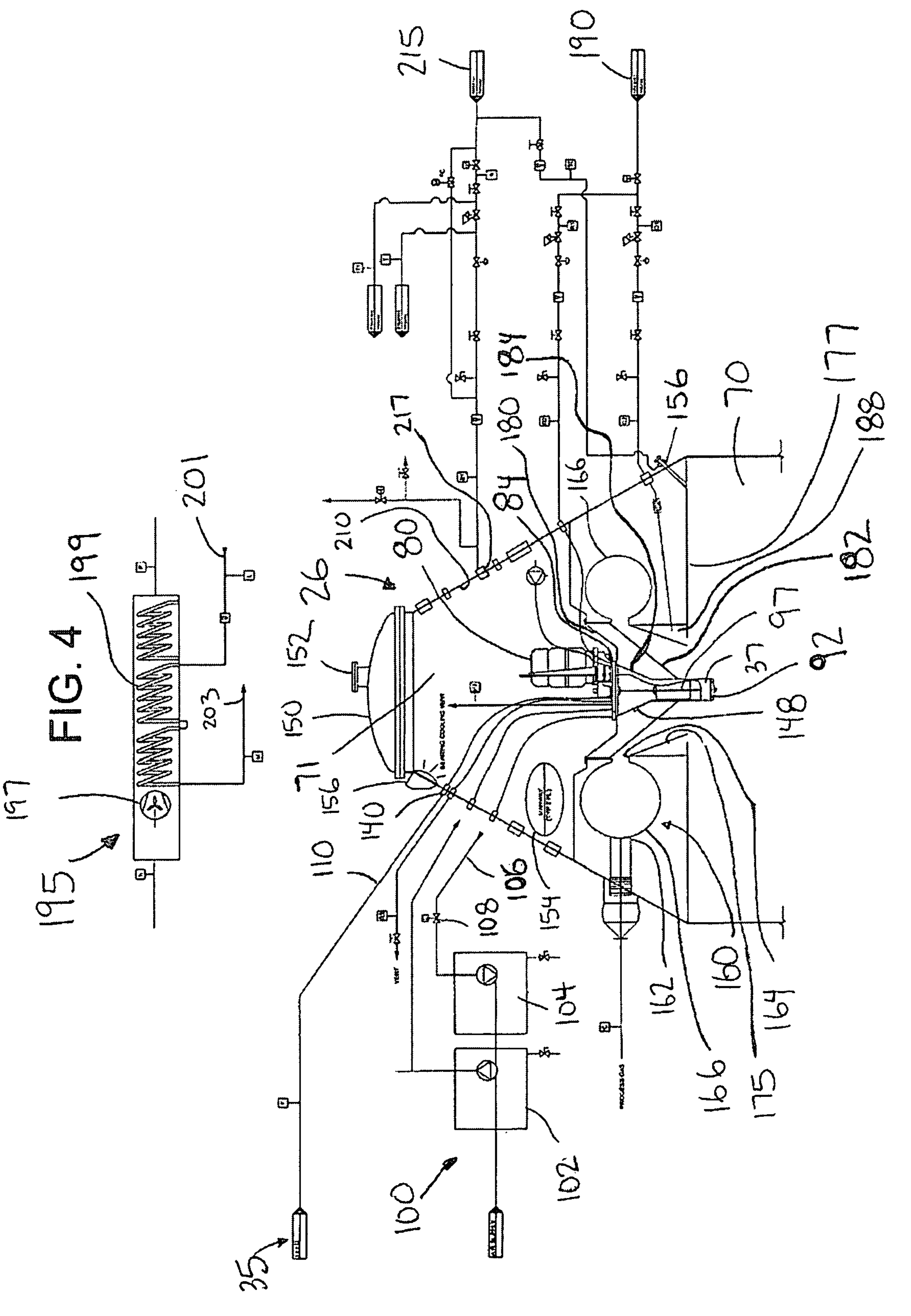
FIG. 4 is an enlarged, fragmentary elevational view of a dryer of the vapor atmosphere spray dryer of FIG. 1.

Referring to FIG. 4, a lubrication system 100 can be provided that includes a supply oil tank 102 and a waste oil tank 104 that are operably arranged with the atomizer 37 to deliver and receive oil from the atomizer. Fresh oil is supplied to the bearings at timed regular intervals. Spent oil from the bearings accumulates in the sump 97. A connecting line 106 between the sump of the atomizer and the waste oil tank can include a normally-closed oil release valve 108. This valve 108 can be selectively activated to open it and, when necessary, a pump can be operated to pump lubrication oil from the sump 97 of the atomizer 37 to the waste oil tank 104.

The sump 97 can include a high-level switch and a low-level switch which are operably arranged with the lubrication system 100 to selectively discharge spent lubrication oil based on the state of the switches. When the high-level switch is triggered, it can indicate that the sump contains a predetermined amount of oil. The oil release valve 108 opens allowing the system overpressure (or the waste oil pump if there is no system overpressure) to transfer the spent oil to the waste oil tank 104 (until the low-level switch is triggered). When the low-level switch is triggered, it can indicate that the oil level in the sump 97 is below a predetermined amount and the oil discharge valve 108 is closed to prevent any undesirable leakage of air from the dryer enclosure.

Referring to FIGS. 4 and 5, a feed slurry supply hose 110 can deliver feed slurry to a feed distributor 112 which uniformly conveys the feed slurry to the distributing wheel 92. The distributing wheel 92 can include a central, interior cavity or bowl 114 for receiving the feed slurry and a plurality of exit orifices 116 radially disposed around the spindle in predetermined relationship with each other. The feed slurry can be discharged from the rotating wheel 92 via the exit orifices 116 under conditions of shear such that an atomized mist of feed slurry is discharged from the rotating wheel 92.

Referring to FIGS. 1 and 2, the fan 22 is fluidly connected to the heater system 24 and to the bag house filter 28. The fan 22 can circulate the superheated vapor found in the system when operating at a steady state. The fan 22 can convey the superheated vapor via the conduit A to the heater system 24 for heating, which in turn directs the superheated vapor through the conduit C to the dryer 26 and then through the conduit D to the bag house filter 28. The fan 22 can receive superheated vapor from the bag house filter 28 through the conduit E to complete a cycle through the closed-loop circuit 21.

Referring to FIG. 1, the fan 22 is provided with a shaft seal to prevent leakage of vapor between the fan housing and the shaft. An air supply 120 delivers a supply of compressed air to the seal.

During start-up of the steam atmosphere spray dryer 20, the atmospheric air which entered through various access doors and ports during cleaning, remains in the system. The fan 22 can operate such that the air in the closed-loop circuit 21 circulates through the circuit 21 through the heater 24, the dryer 26, and the bag house filter 28 such that all internal surfaces of the dryer 20 are heated above the boiling point of the feed. When water 74 is introduced into the dryer by the pump 78 through the atomizer 37, the water evaporates and mixes with the air. The increased mass of vapor and air results in an increase in dryer pressure, causing the pressure control valve 250 to open and allow a mixture of air and vapor to escape to atmosphere through the vent valve 66. As vapor continues to be generated in the dryer, and venting continues, the air is exchanged for vapor until the entire dryer volume contains only superheated vapor.

Referring to FIGS. 1 and 2, the heater system 24 can heat the vapor in the closed-loop circuit 21 to a predetermined temperature, such as, 1100° Fahrenheit, for example. The heater system 24 is fluidly connected to the fan 22 and to the dryer 26. The heater system 24 can include an inlet 124 and an outlet 125. The inlet 124 is fluidly connected to the fan 22. The outlet 125 of the heater system 24 is fluidly connected to a vapor inlet 130 of the dryer 26 to deliver superheated vapor to the dryer 26. The heater system 24 can be configured to provide sufficient energy to evaporate a predetermined maximum flow of feed slurry.

Referring to FIG. 1, the heater system 24 can include a plurality of indirect-fired heaters 132, 133, 134, 135. The heaters can be electrically operated. In this embodiment, four electric, indirect-fired heaters 132, 133, 134, 135 are provided. A first pair 137 of heaters 132, 133 is connected in series, and a second pair 138 of heaters 134, 135 is connected in series. The first and second pairs 137, 138 of heaters are connected in parallel. This arrangement provides approximately four megawatts of heating power. In other embodiments, another number of heaters can be used and at least one heater can be provided that operates with natural gas, oil, a fossil fuel, or any other suitable power source.

Referring to FIGS. 1 and 2, the dryer 26 is fluidly connected to the heater system 24 and to the bag house filter 28 as part of the closed-loop circuit 21. The dryer 26 includes the drying chamber 70 capped by the pressure chamber 71, in this case a pressure dome, a liquid feed inlet 140, the vapor inlet 130, and a vapor and powder outlet 142.

Referring to FIG. 4, the dryer 26 receives feed slurry from the feed system 35 in the pressure dome 71 and dries the feed slurry in the drying chamber 70. The pressure dome 71 houses the centrifugal atomizer 37 associated with the feed system 35. The feed slurry hose 110 can be operably arranged with the liquid feed inlet 140 to allow the feed slurry to be conveyed into the pressure dome 71. The pressure dome can include a mounting insert 148 for supporting the centrifugal atomizer 37 such that the distribution wheel 92 of the centrifugal atomizer 37 projects into the drying chamber 70.

The pressure chamber can include an access door 150 configured to allow the centrifugal atomizer 37 equipment to pass therethrough. The access door 150 includes a maintenance port 152 configured to allow a hook to pass therethrough for lifting the atomizer 37 off of its support 148 for service without removing it from the dome 71. In addition, a plurality of manway access doors 154 can be provided to allow for the entry of personnel into the pressure dome and the drying chamber for maintenance, for example, and a plurality of sight glasses 156 can be provided for the ready visual inspection of the interiors of the pressure dome 71 and the drying chamber 70.

A vapor distribution system 160 can be provided in the pressure dome 71 that comprises a portion of the closed-loop circuit 21. The vapor distribution system 160 can include an inlet 162, which is fluidly connected to the vapor inlet 130 of the dryer, and an outlet 164, which is cooperatively arranged with the drying chamber 70 such that the recirculated mass of superheated vapor circulates through the vapor distribution system 160 and into the drying chamber 70. The outlet 164 of the vapor distribution system is arranged with the atomizer 37 such that the circulated mass of superheated vapor commingles with the atomized feed slurry discharged into the drying chamber 70.

The vapor distribution system 160 cooperates with the atomizer 37 to combine superheated vapor from the heater system 24 and the supply of feed from the feed system 35 to provide a mist of atomized feed slurry flowing from the wheel 92 of the atomizer 37 into the drying chamber 70. The atomized feed and the superheated vapor interact with each other inside the drying chamber 70 such that the liquid entrained in the feed changes to superheated vapor, thereby increasing the amount of superheated vapor within the closed-loop circuit 21 and decreasing the temperature of the recirculated superheated vapor.

Referring to FIG. 1, powder (comprising dried feed solids) and superheated vapor exit the drying chamber 70 via the vapor and powder outlet 142 and are conveyed to a vapor and powder inlet 170 of the bag house filter 28. The temperature of the superheated vapor discharging from the vapor and powder outlet 142 is less than the temperature of the superheated vapor entering the dryer 26 at the vapor inlet 130. In one arrangement, the temperature of the superheated vapor at the vapor inlet 130 is approximately 1100° F., and the temperature of the superheated vapor discharged from the drying chamber via the vapor and powder outlet 142 is between about 300° F. and 400° F., typically at about 350° F.

Figure 3:
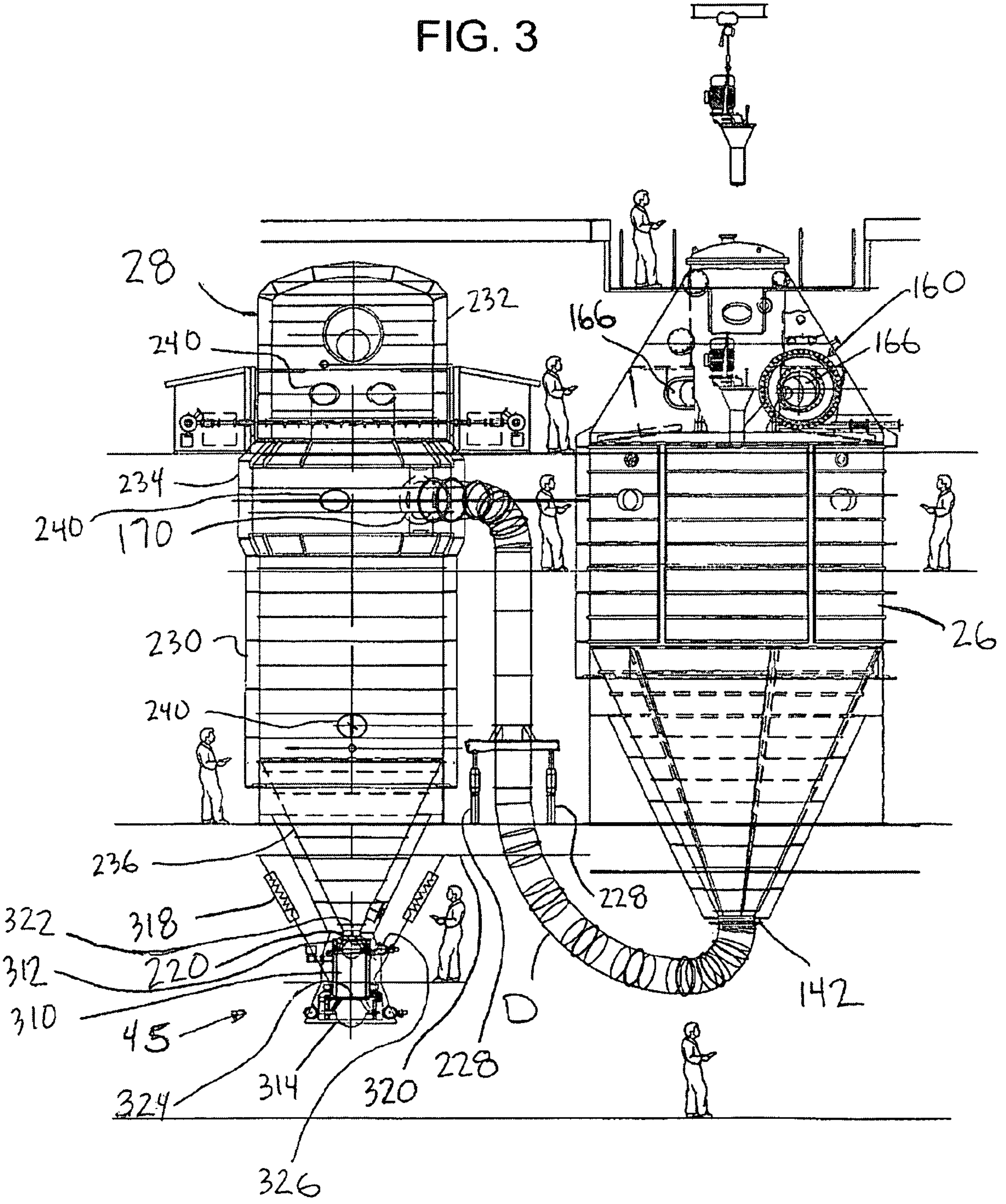
FIG. 3 is a partial elevational view of the vapor atmosphere spray dryer of FIG. 1.

Referring to FIGS. 2-4, the vapor distribution system 160 includes a conduit 166 that extends circumferentially around the atomizer 37 so that the conduit 166 is in substantial surrounding relationship with the atomizer. The conduit 166 has an entry end 167 and a termination end 168 (FIG. 2). The outlet 164 can extend circumferentially a predetermined distance between the entry end 167 and the termination end 168. In some embodiments, the outlet extends completely between the entry end and the termination end. The diameter of the conduit 166 decreases between the entry end 167 and the termination end 168. The conduit 166 has a snail-shell appearance in that the conduit 166 has a generally spiral shape between its entry end 167 and its termination end 168 and the diameter of the conduit decreases between the entry end 167 and the termination end 168 in a generally linear fashion.

Referring to FIG. 4, the vapor distribution system 160 includes a flow insert 175 for directing the circulated mass of superheated vapor discharging from the outlet 164 of the vapor distribution system 160 into commingled relationship with the atomized feed slurry discharging from the centrifugal atomizer 37. The flow insert 175 can include a plurality of vanes and adjustable wings that are configured to alter the flow of the circulating superheated vapor through the vapor distribution system to enhance the commingling relationship between the superheated vapor and the atomized feed slurry.

The pressure dome 71 and the drying chamber 70 are separated by an insulative layer 177. The insulative layer 177 is disposed between the pressure dome 71 and the drying chamber 70. An upper surface 180 of the support cone 148 supports the centrifugal atomizer 37 by a flange at its mounting end 84. A lower surface 182 of the support cone 148 can help define an area for the flow insert 175. The support cone 148 can include insulation in the cavity defined between its upper and lower surfaces 180, 182. An inner sidewall 184 of the support cone can be configured to conform to the shape of the atomizer 37.

Referring to FIG. 4, the dryer 26 includes a cooling ring 188 disposed between the pressure chamber 71 and the drying chamber 70. The cooling ring 188 separates the hot face of the superheated vapor outlet 164 of the vapor distribution system from the roof of the drying chamber 70 to help prevent localized cracking or overheating of product deposits. The cooling is accomplished by a stream of superheated vapor 190 that is at a temperature close to the dryer outlet temperature.

The circulated mass of superheated vapor discharging from the outlet 164 of the vapor distribution system can be at a first temperature. A stream of superheated vapor 190 that is at a second temperature, which is lower than the first temperature of the circulated mass of superheated vapor discharging from the outlet 164 of the vapor distribution system, can be operably arranged with the cooling ring 188 such that the stream of superheated vapor 190 at the second temperature encircles the circulated mass of superheated vapor discharging from the outlet 164 of the vapor distribution system. The second temperature can be substantially close to the dryer outlet temperature.

Referring to FIG. 4, a cooling system 195 can be provided within the pressure chamber 71 to dissipate the heat generated by the atomizer motor 80 and lost from the vapor distribution system. The cooling system 195 includes a re-circulating fan 197 and a plurality of cooling coils 199 using cooling tower water. A cold water supply 201 can deliver cold water, such as water at 78° F., for example, to the cooling coils 199 which returns water to the tank via a water return line 203. The fan 197 can be arranged with the coils 199 to direct a stream of air over the coils 199 to help reduce the temperature within the dome 71.

Referring to FIG. 4, the pressure dome 71 includes a pressure containment shell 210 which defines a pressurized interior of the pressure dome. The pressure dome 71 can have a pressure that is greater than the pressure in the drying chamber 70 to create a positive pressure differential therebetween. If the pressure in the drying chamber 70 were greater than the pressure in the pressure dome 71, then feed in the drying chamber 70 may have a tendency to infiltrate the spindle bearings of the centrifugal atomizer 37. In such an occurrence, the atomizer 37 would quickly fail, the bearings likely blowing in short order.

A controller can be provided that is operably arranged with a supply of pressurized air 215 to regulate pressure in the dome 71 to maintain the pressure therein at a predetermined higher level than the pressure in the drying chamber 70. The pressure chamber 71 can include a pressurized air port 217 for receiving the supply of pressurized air 215 therethrough. The pressure dome 71 can be at a first operating pressure and the drying chamber 70 at a second operating pressure, which is less than the first operating pressure within the pressure chamber 71. In some embodiments, the first operating pressure within the pressure chamber 71 is greater than the second operating pressure within the drying chamber 70 by between about one-half inch and about ten inches of water column. In some embodiments, the second operating pressure can be between about one psi and about twelve psi. In yet other embodiments, the second operating pressure can be greater than twelve psi, such as anywhere in a range between twelve psi and about eighty psi, for example.

A pressure sensor can be disposed within both the pressure chamber 71 and the drying chamber 70. The controller can be operably arranged with the pressure sensors within the pressure dome 71 and the drying chamber 70 and the supply of pressurized air 215. The controller is adapted to regulate the pressure in the pressure chamber 71 to maintain the pressure in the pressure chamber 71 at a higher level than the pressure in the drying chamber 70 by selectively directing the flow of pressurized air 215 into the pressure chamber 71 based upon the pressure information it receives from the sensors within the pressure dome 71 and the drying chamber 70.

Referring to FIGS. 1-3, the bag house filter 28 can separate the dry feed from the superheated vapor. The bag house filter 28 can include the vapor and powder inlet 170, a powder outlet 220 for expelling dried product therefrom, and a pair vapor outlets 222, 224 for expelling pressurized, superheated vapor therefrom.

Referring to FIG. 1, the primary vapor outlet 222 of the bag house filter 28 is fluidly connected to the fan 22 by the conduit E. The auxiliary vapor outlet 224 of the bag house filter 28 is selectively fluidly connected to the secondary component 50 via the conduit G.

Referring to FIG. 3, the vapor and powder feed inlet 170 of the bag house filter 28 is fluidly connected to the vapor and powder outlet 142 of the dryer 26 by the conduit D. A pair of constant support hangers 228 can be provided to help support the conduit D fluidly connecting the vapor and powder outlet 142 of the dryer and the vapor and powder inlet 170 of the bag house filter. The bag house filter 28 is operably arranged with the powder discharge system 45 via the powder outlet 220.

Referring to FIGS. 1 and 3, the bag house filter 28 can include a generally cylindrical housing 230 that defines an upper vapor distribution area 232, an intermediate bustle portion 234 and a lower conical feed distribution area 236. The primary and auxiliary vapor outlets 222, 224 can be disposed in the vapor distribution area 232. The vapor and powder feed inlet 170 can be disposed in the bustle portion 234. The powder outlet 220 can be disposed in the feed distribution area 236. The bag house filter 28 can include a plurality of manway access doors 240 to allow for the entry of personnel into the vapor distribution area 232, the bustle portion 234, and the feed distribution area 236 for maintenance, for example, and a plurality of sight glasses 242 for the ready visual inspection of the interior of the bag house filter 28.

Figure 7:
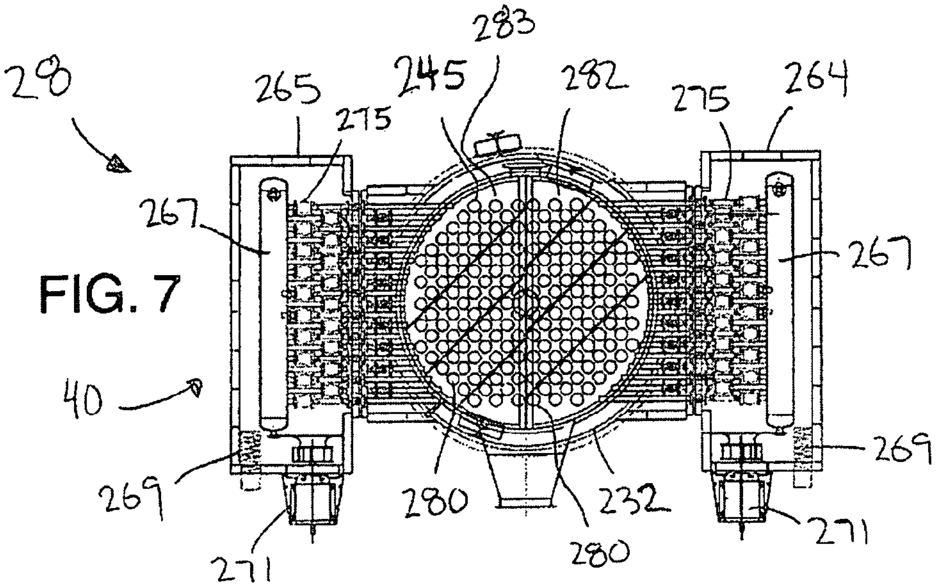
FIG. 7 is a top plan view of the bag house filter of FIG. 6.
Figure 6:
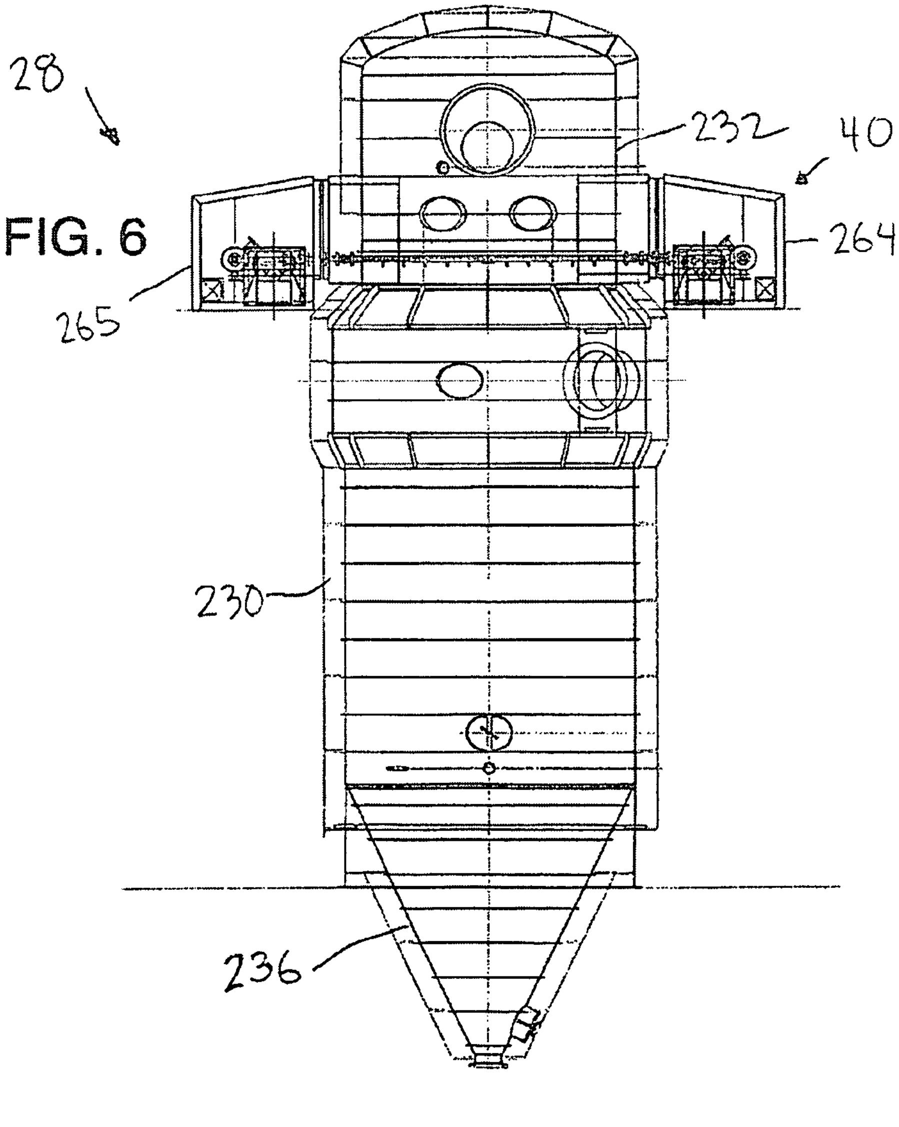
FIG. 6 is an elevational view of a bag house filter of the vapor atmosphere spray dryer of FIG. 1.

Referring to FIGS. 6 and 7, the housing 230 of the bag house filter 28 contains a plurality of cylindrical filter bags 245 that are suspended from a tube sheet forming the lower boundary of the vapor distribution area 232. In this embodiment, there are one hundred sixty-six bags 245 that are about twenty feet long and about six inches in diameter. The filter bags 245 can act to separate the dry feed and the superheated vapor. The bags 245 can be formed from a fabric that is permeable such that the superheated vapor can pass therethrough. In some embodiments, the fabric can be one commercially available from W.L. Gore & Associates, Inc. of Newark, Del., under the Gore-Tex® trade name.

The dry feed can fall to the feed collection area 236 by the action of gravity upon it, and the superheated vapor can pass through the bags 245 up into the vapor distribution area 232. The dry feed can exit from the feed collection area 236 to the powder discharge system and on to a conventional conveyor system for further processing and/or packaging, for example.

Referring to FIGS. 1 and 2, the superheated vapor in the upper area 232 of the bag house filter 28 can be directed back to the fan 22 via the recycle conduit E. The temperature of the superheated vapor discharged from the bag house filter 28 can be between about 300° F. and about 400° F. in cases where the inlet temperature of the superheated vapor at the dryer 28 is about 1100° F., for example.

The pressure of the superheated vapor in the closed loop circuit 21 is increased by the evaporation of the fluid in the feed slurry. The pressure in the closed-loop circuit 21 can be reduced by directing some of the superheated vapor from the upper area 232 of the bag house filter 28 to a secondary component 50 via the auxiliary conduit G.

A pressure-controlled valve 250 can be operably connected to the closed-loop circuit 21 to regulate the amount of superheated vapor diverted from the closed-loop circuit 21 to the auxiliary conduit G. The pressure-controlled valve 250 is adapted to divert at least a portion of the vapor evaporated from the supply of atomized feed slurry in the dryer 28 from the closed-loop circuit 21 when the valve 250 is in an open position.

The secondary component 50 includes structure for performing a heat transfer condensing step and can be selectively fluidly connected to the closed-loop circuit 21 via the pressure-controlled valve 250. The secondary component 50 can use the superheated vapor diverted from the closed-loop circuit 21, which is at the dryer operating pressure, for its own operation. The secondary component 50 can include an evaporator, for example. In some embodiments, the evaporator can comprise a second effect vapor arrangement for concentrating feed. The diverted, superheated vapor could be used to sparge in other embodiments. In yet other embodiments, the diverted superheated vapor is preferably at a pressure of about 20 psi or higher and is used to generate electricity in a turbine.

A pressure sensor can be disposed within the drying chamber 70 of the dryer 26 and operably connected to the pressure-controlled valve 250. The valve 250 can be modulated as a function of the pressure measured inside the drying chamber 70 such that the valve 250 opens when the pressure inside the drying chamber 70 exceeds a predetermined amount and closes when the pressure inside the drying chamber 70 falls below the predetermined amount. The valve 250 can be adapted such that it is in an open position when the pressure sensed by the pressure sensor in the drying chamber 70 exceeds a predetermined amount and in a closed position when the pressure sensed by the pressure sensor in the drying chamber 70 is below a predetermined amount. The pressure-controlled valve 250 can modulate between the open position and the closed position to maintain the desired operating pressure within the drying chamber 70 of the dryer 26.

Referring to FIGS. 1, 6, and 7, the bag house filter 28 can include the pulse cleaning system 40 for selectively directing a supply of superheated vapor 255 through the interior of the bags 245 in sequential fashion to periodically pulse clean the exterior surface of the bags 245 such that dry feed accumulated on the exterior surface of each bag 245 can be expelled therefrom to fall to the feed collection area 236. The supply of superheated vapor 255 can be any suitable vapor, such as saturated steam directed through a pressure reducer, for example. The superheated vapor 255 used in the pulse cleaning system can be the same kind of vapor circulating in the closed-loop circuit 21.

The pulse cleaning system 40 can selectively direct superheated vapor through a plurality of bags 245 in successive fashion to periodically pulse clean the exterior surface of each bag 245. In some embodiments, the pulse cleaning system 40 can sequentially pulse clean one bag 245 at a time. In other embodiments, the pulse cleaning system 40 selectively directs superheated vapor through the interiors of a group of bags 245 simultaneously. Different groups of bags 245 can be pulse-cleaned simultaneously such that the pulse cleaning system 40 sequentially pulse cleans a plurality of groups of bags. In some embodiments, the totality of bags 245 can be divided into like-numbered groups of bags, and in other embodiments, the bags 245 can be divided into groups that have different numbers from each other. In yet other embodiments, the pulse cleaning system 40 can selectively direct a supply of superheated vapor through the interiors of all of the bags simultaneously.

Referring to FIGS. 1, 6 and 7, in this embodiment, the pulse cleaning system 40 includes a supply of saturated steam 256 under 8 bars of pressure and a pair of pressure reducers 257, heaters 259, and shut-off valves 261 connected in parallel to a pair of enclosures 264, 265 which each houses a pulse header 267, a heater 269, and a fan 271. The pressure reducers 257 can act to superheat the supply of saturated steam 256.

Referring to FIG. 7, each pulse header 267 includes a plurality of valves 275. Each valve 275 is interposed between the supply of superheated vapor 255 and at least one bag 245 for selective pulsing of the bag or bags to which it is connected. In this embodiment, each pulse header 267 includes nineteen valves 275. Each valve 275 can be a fast-acting electric solenoid valve, for example.

The filter bags 245 are arranged in a plurality of rows 280 which each can be divided into a first half 282 and a second half 283 of the bag house filter system. In this embodiment, there are nineteen rows 280 of filter bags 245. Each valve 275 of the pulse header 267 of the first enclosure 264 is operably arranged with the first half 282 of one row, and each valve 275 of the pulse header 267 of the second enclosure 265 is operably arranged with the second half 283 of one row. In other embodiments, other arrangements can be used.

The heater 269 and the plug fan 271 can be operated to maintain the temperature within the respective enclosure 264, 265 to a predetermined temperature, such as 300° F., for example to help maintain the vapor in a superheated state. The heater 269 can be any suitable type, such as an electric 15 kW duct heater, for example. The fan 271 can be any suitable type, such as a forced-recirculation plug fan, for example.

Figure 8:
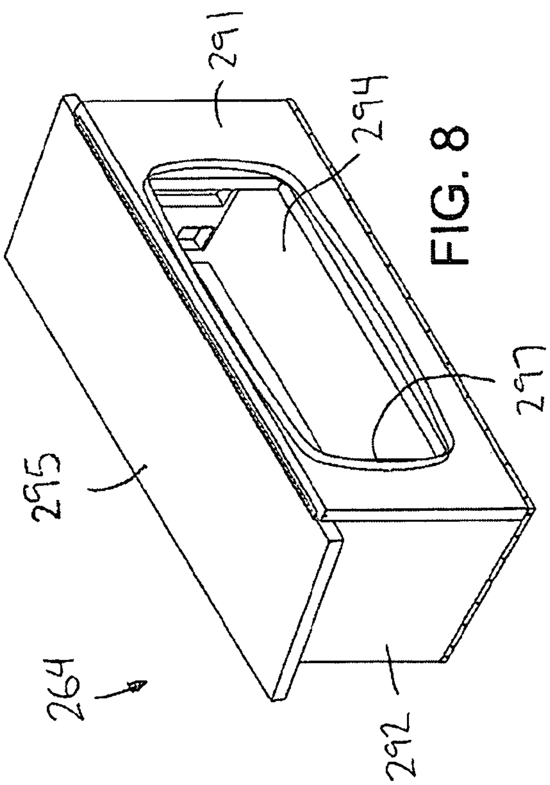
FIG. 8 is a perspective view of a convection oven enclosure for the pulse cleaning system of the bag house filter of FIG. 6.
Figure 10:
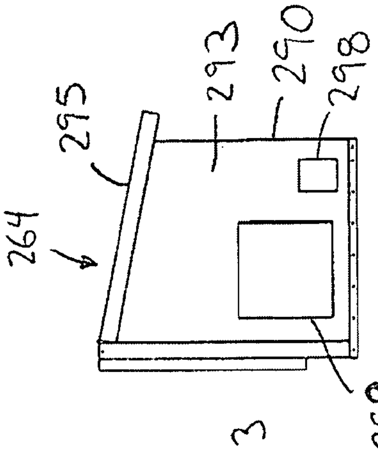
FIG. 10 is an end elevational view of the convection oven enclosure.
Figure 9:
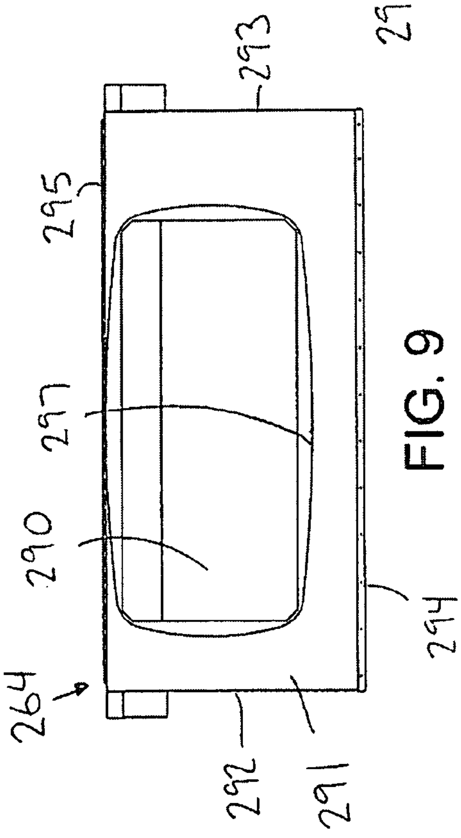
FIG. 9 an elevational view of the convection oven enclosure showing an inner wall thereof.

Referring to FIGS. 8-10, the first enclosure 264 is shown. The second enclosure is similar in construction to the first enclosure 264. Accordingly, the description of the first enclosure 264 is applicable to the second enclosure, as well. The enclosure 264 is insulated and includes an outer wall 290, an inner wall 291, a pair of end walls 292, 293, a bottom 294, and a top 295. The inner wall 291 of the enclosure is disposed adjacent the bustle portion and includes an opening 297 through which the connection between the pulse header and the filter bags associated with that pulse header can be made. One of the end walls 293 includes a pair of openings 298, 299 for accommodating the heater and the plug fan, respectively. The top 295 can be hingedly connected to the inner wall 291 to allow ready access to the interior of the enclosure 264.

Referring to FIGS. 1 and 3, the powder discharge system 45 is arranged with the bag house filter 28 to receive powder therefrom. The powder discharge system 45 is connected to the powder outlet 220 of the bag house filter 28. The powder discharge system 45 can have heat tracing applied to the exterior thereof to help prevent condensation.

The powder discharge system 45 can include a holding chamber 310, an upper, normally-open powder valve 312, a lower, normally-closed discharge valve 314, a normally-closed vent valve 316, and a control unit. Referring to FIG. 3, a plurality of spring supports 318 can be provided from which the holding chamber 310 can be suspended. The spring supports 318 can be secured to an overhead structure 320 and to the holding chamber 310 to suspend the holding chamber therefrom. As the feed collection area 236 and the holding chamber 310 heat and expand, the springs 318 can expand in response to the expansion movement.

The holding chamber 310 can include an upper inlet 322 for receiving powder from the powder outlet 220 of the bag house filter, a lower outlet 324 for periodically discharging powder accumulated in the holding chamber 310, and a vent port 326 for selectively venting superheated vapor contained within the holding chamber 310. The normally-open powder valve 312 can be operable to selectively close the inlet 322 of the holding chamber 310 to stop the flow of powder from the bag house filter 28 into the holding chamber 310. The normally-closed discharge valve 314 can be operable to selectively open the outlet 324 of the holding chamber 310 to permit the discharge of the powder accumulated in the holding chamber 310. The normally-closed vent valve 316 can be operable to selectively open the vent port 326 of the holding chamber 310 to allow for the venting of superheated vapor from the holding chamber 310.

The powder valve 312 is arranged within the inlet 322 of the holding chamber 310 and is movable between an open position and a closed position. When the powder valve 312 is in the open position, the inlet 322 communicates with the interior of the holding chamber 310 to allow powder to move through the inlet 322 into the holding chamber 310. When the powder valve 312 is in the closed position, the inlet 322 is occluded.

The discharge valve 314 is arranged with the outlet 324 of the holding chamber 310 and is movable between an open position and a closed position. When the discharge valve 314 is in the open position, the outlet 324 communicates with the interior of the holding chamber 310 to allow powder accumulated in the holding chamber 310 to discharge from the holding chamber 310 via the outlet 324. When the discharge valve 314 is in the closed position, the outlet 324 is occluded.

The vent valve 316 is arranged with the vent port 326 of the holding chamber 310 and is movable between an open position and closed position. When the vent valve 316 is in the open position, the vent port 326 communicates with the interior of the holding chamber 310 to allow the vapor within the holding chamber 310 to escape from the holding chamber 310 via the vent port 326. When the vent valve 316 is in the closed position, the vent port 326 is occluded.

The control unit is operably connected to the powder valve 312, the discharge valve 314, and the vent valve 316. The control unit can be adapted to place the powder discharge system 45 in a fill position for receiving powder form the bag house filter 28 and a discharge position for discharging powder from the holding chamber 310. In the fill position, the powder valve 312 is in the open position, the vent valve 316 is in the closed position, and the discharge valve 314 is in the closed position. In the discharge position, the powder valve 312 is in the closed position, the vent valve 316 is in the open position, and the discharge valve 314 is in the open position.

The control unit is adapted to move the powder discharge system from the fill position to the discharge position in a sequential manner such that the powder valve 312 is first moved from the open position to the closed position, the vent valve 316 is moved next from the closed position to the open position, and the discharge valve 314 is then moved from the closed position to the open position. The control unit can operate to periodically activate the valves in sequence such that the powder valve 312 is in the closed position to prevent powder from entering the holding chamber 310, the vent valve 316 is in the open position to allow the vapor to escape from the holding chamber 310 via the vent port 326 to bring the pressure within the holding chamber 310 to atmospheric pressure, and then the discharge valve 314 is in the open position to allow the powder within the holding chamber 310 to discharge from the holding chamber 310 via the outlet 324. The powder discharge system 45 can include conventional conveyor equipment to transport the dried powder to another location onsite for further processing or to a packaging area to ready the powder for shipment, for example.

The control unit can be adapted to move the powder discharge system 45 from the discharge position to the fill position in a staggered manner such that the discharge valve 314 and the vent valve 316 are moved from the open position to the closed position and then the powder valve 312 is moved from the closed position to the open position. In moving from the discharge position to the fill position, the discharge valve 314 and the vent valve 316 can be closed in any order or simultaneously.

Referring to FIG. 1, a secondary filter system 335 can be provided to filter the vapor vented from the holding chamber 310. The secondary filter system 335 is connected to the vent port 326 of the holding chamber 310 to filter and recover entrained powder from the vapor vented from the holding chamber 310 via the vent port 326. The secondary filter system 335 is heated and ventilated to discharge the vapor to atmosphere without substantial condensation which can to allow substantially complete powder recovery. The secondary filter system is controlled in conjunction with the powder discharge valve system.

The secondary filter system 335 includes a filter member 337 disposed in a body 339, a supply of compressed air 341, and a heater 343. The body 339 can include an inlet venturi 345 and an outlet venturi 347 such that vapor travels into the inlet venturi 345, through the filter member 337, and out the outlet venturi 347. The air supply 341 is fluidly connected to the heater 343 by and to the outlet venturi 347 by a conduit U. The heater 343 is fluidly connected to the inlet venturi 345 and to the filter member 337. The body 339 can include a collection port 349 through which powder can fall to be recovered.

With this arrangement, a first supply of compressed air 351, which is heated to a first temperature by the heater 343, is connected to the inlet venturi 345 such that the first supply of compressed air travels into the inlet venturi 345 and blends with the vented vapor to reduce the temperature at which condensation may occur. The blend of air and vapor passes through the filter member 337 and out the outlet venturi 347. A second supply of compressed air 352 at a second temperature is connected to the outlet venturi 347 such that the second supply of compressed air travels into the outlet venturi 347 and out of the system to urge the flow of the vented vapor through the secondary filter 335. The second temperature is less than the first temperature.

A third supply of compressed air 353, which can be heated by the heater 343 to the first temperature, can be used as part of a back-pulsing cleaning system provided for periodically back-pulse cleaning the filter member 337. The back-pulsing cleaning system can include a fast-acting valve 355 to selectively control the flow of the third supply of compressed air 353 to pulse clean the filter member 337.

Although particular reference has been made to vapor atmosphere spray dryers, features of the disclosure also have applicability to other dryers that may not include an atomizer. For example, in some embodiments, a vapor atmosphere dryer can be provided that includes a closed-loop circuit with a dryer, a bag house filter system, a fan, and a heater system that are fluidly connected together to circulate a superheated vapor therethrough. A feed system can be provided for delivering a supply of feed slurry into the dryer. The bag house filter system can include a plurality of bags and a pulse cleaning system for selectively directing superheated vapor through the interior of at least one of the bags to periodically pulse clean the exterior surface thereof. The pulse cleaning system can selectively direct a supply of superheated vapor through the interiors of a group of the bags simultaneously.

The pulse cleaning system can include a pulse header including a plurality of valves with each valve being interposed between the supply of superheated vapor and at least one bag for selective pulsing of the at least one bag. The pulse cleaning system can be housed within an enclosure which includes a heater and a plug fan.

In still other embodiments, a vapor atmosphere dryer can be provided that includes a closed-loop circuit having a dryer, a bag house filter system, a fan, and a heater system that are fluidly connected together to circulate a superheated vapor therethrough. A feed system for delivering a supply of feed slurry into the dryer can be provided. A powder discharge system can be connected to the bag house filter such that the bag house filter delivers a supply of powder to the powder discharge system. The powder discharge system can include a holding chamber, a powder valve, a discharge valve, a vent valve, and a control unit. The holding chamber can include an inlet for receiving powder from the bag house filter, an outlet, and a vent port. The powder valve is arranged with the inlet of the holding chamber and movable between an open position wherein the inlet communicates with the interior of the holding chamber to allow powder to move through the inlet into the holding chamber and a closed position wherein the inlet is occluded. The discharge valve is arranged with the outlet of the holding chamber and is movable between an open position wherein the outlet communicates with the interior of the holding chamber to allow powder to move from the holding chamber out of the outlet and closed position wherein the outlet is occluded. The vent valve is arranged with the vent port of the holding chamber and is movable between an open position, wherein the vent port communicates with the interior of the holding chamber to allow the vapor within the holding chamber to escape from the holding chamber via the vent port, and a closed position, wherein the vent port is occluded. The control unit can be operably connected to the powder valve, the discharge valve, and the vent valve.

The control unit can be adapted to place the powder discharge system in a filled position wherein the powder valve is in the open position, the vent valve is in the closed position, and the discharge valve is in the closed position. The control unit can be adapted to place the powder discharge system in a discharge position wherein the powder valve is in the closed position, the vent valve is in the open position, and the discharge valve is in the open position. The control unit can be adapted to move the powder discharge system from the fill position to the discharge position in a sequential manner such that the powder valve is first moved from the open position to the closed position, the vent valve is then moved from the closed position to the open position, and the discharge valve is then moved from the closed position to the open position. The powder valve can be a normally-open valve, the discharge valve a normally-closed valve, and the vent valve a normally-closed valve.

The vapor atmosphere dryer can include a secondary filter system connected to the vent port of the holding chamber to filter and recover entrained powder from the vapor vented from the holding chamber via the vent port. The secondary filter system can be heated and ventilated to discharge the vapor to atmosphere without substantial condensation. The secondary filter system can include a filter having a filter member, an inlet venturi mounted thereto, and an outlet venturi mounted thereto such that vapor travels into the inlet venturi through the filter member and out the outlet venturi. A first supply of compressed air at a first temperature can be connected to the inlet venturi such that the first supply of compressed air travels into the inlet venturi through the filter member and out the outlet venturi. A second supply of compressed air at a second temperature can be connected to the outlet venturi such that the second supply of compressed air travels into the outlet venturi and out of the system to urge the flow of the vented vapor through the secondary filter. A back-pulsing cleaning system having a supply of heated compressed air can be provided to periodically back-pulse cleaning the filter member.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vapor atmosphere spray dryer comprising:

a closed-loop circuit including a dryer, a bag house filter system, a fan, and a heater system, the dryer, the bag house filter, the fan, and the heater system fluidly connected together for circulating a mass of superheated vapor through the closed-loop circuit;

a centrifugal atomizer disposed within the dryer;

a feed system for delivering a supply of feed slurry to the centrifugal atomizer, the feed system operably arranged with the centrifugal atomizer for providing a supply of atomized feed slurry for combination with the circulated mass of superheated vapor within the dryer; and a powder discharge system connected to the powder outlet of the bag house filter to receive powder therefrom, the powder discharge system including a holding chamber, an upper, normally-open powder valve, a lower, normally-closed discharge valve, a normally-closed vent valve, and a control unit, the holding chamber including an upper inlet for receiving powder from the powder outlet of the bag house filter, a lower outlet, and a vent port, the normally-open powder valve operable to selectively close the inlet of the holding chamber, the normally-closed discharge valve operable to selectively open the outlet of the holding chamber, the normally-closed vent operable to selectively open the vent port of the holding chamber, the control unit adapted to periodically activate the valves in sequence such that the powder valve is in a closed position to prevent powder from entering the holding chamber, the vent valve is in an open position to allow the vapor to escape from the holdinq chamber via the vent port to bring the pressure within the holding chamber to atmospheric pressure, and then the discharge valve is in an open position to allow the powder within the holding chamber to discharge therefrom, wherein the dryer includes a superheated vapor inlet, a liquid feed inlet, and a vapor and powder outlet, the bag house filter includes a vapor and powder inlet, a powder outlet for expelling dried product therefrom, and a vapor outlet for expelling pressurized, superheated vapor therefrom, the vapor and powder feed inlet fluidly connected to the vapor and powder outlet of the dryer, the fan is fluidly connected to the vapor outlet of the bag house filter, the fan is fluidly connected to the heating system, and the heating system is fluidly connected to the vapor inlet of the dryer, and wherein the closed loop circuit is constructed such that the circulated mass of superheated vapor has an operating pressure of at least 1 psi and the operating pressure of the recirculated mass of superheated vapor is generated by the evaporation of the fluid in the atomized feed slurry in the dryer resulting from the combination of the supply of atomized feed slurry and the circulated mass of superheated vapor.

2. The vapor atmosphere spray dryer according to claim 1, further comprising:

a secondary filter system connected to the vent port of the holding chamber to filter the vapor vented therefrom.

3. The vapor atmosphere spray dryer according to claim 1, wherein the dryer includes a drying chamber and a pressure chamber, the atomizer disposed within the pressure chamber, the atomizer having an outlet end projecting into the drying chamber such that the supply of atomized feed slurry discharges from the atomizer into the drying chamber.

4. The vapor atmosphere spray dryer according to claim 3, wherein the pressure chamber is at a first operating pressure and the drying chamber is at a second operating pressure, the first pressure being greater than the second pressure.

5. The vapor atmosphere spray dryer according to claim 4, wherein the first pressure is greater than the second pressure by between about one-half inch and about ten inches of water column.

6. The vapor atmosphere spray dryer according to claim 4, further comprising a supply of pressurized air, the pressure chamber including a pressurized air port for receiving the supply of pressurized air therethrough and a pressure sensor disposed therein, the drying chamber includes a pressure sensor disposed therein, and a controller is operably arranged with the pressure sensors and the supply of pressurized air, the controller adapted to regulate the pressure in the pressure chamber to maintain the first pressure in the pressure chamber at a higher level than the second pressure in the drying chamber.

7. The vapor atmosphere spray dryer according to claim 1, wherein the dryer includes a vapor distribution system, the vapor distribution system comprising a part of the closed-loop circuit, the vapor distribution system including an outlet cooperatively arranged with the drying chamber such that the recirculated mass of superheated vapor circulates through the drying chamber, the outlet of the vapor distribution system arranged with the atomizer such that the recirculated mass of superheated vapor commingles with the atomized feed slurry in the drying chamber.

8. The vapor atmosphere spray dryer according to claim 3, wherein the dryer includes a cooling ring disposed between the pressure chamber and the drying chamber.

9. The vapor atmosphere spray dryer according to claim 8, wherein the recirculated mass of superheated vapor discharging from the outlet of the vapor distribution system is at a first temperature, and a stream of superheated vapor that is at a second temperature which is lower than the first temperature is operably arranged with the cooling ring such that the stream of superheated vapor at the second temperature encircles the recirculated mass of superheated vapor discharging from the outlet of the vapor distribution system.

10. The vapor atmosphere spray dryer according to claim 9, wherein the second temperature is substantially close to the dryer outlet temperature.

11. The vapor atmosphere spray dryer according to claim 1, wherein the bag house filter system includes a plurality of bags and a pulse cleaning system for selectively directing a supply of superheated vapor through the interior of at least one of the bags to periodically pulse clean the exterior surface thereof.

12. The vapor atmosphere dryer according to claim 11, wherein the pulse cleaning system includes a pulse header including a plurality of valves, each valve being interposed between the supply of superheated vapor and at least one bag for selective pulsing of the at least one bag.

13. The vapor atmosphere spray dryer according to claim 12, wherein the pulse cleaning system is housed within an enclosure which includes a heater and a plug fan.

14. A vapor atmosphere spray dryer comprising:

a closed-loop circuit including a dryer, a bag house filter system, a fan, and a heater system, the dryer, the bag house filter, the fan, and the heater system fluidly connected together for circulating a mass of superheated vapor through the closed-loop circuit;

a centrifugal atomizer disposed within the dryer;

a feed system operably arranged with the centrifugal atomizer for discharging a supply of atomized feed slurry within the dryer; and a supply of pressurized air, the enclosure including a pressurized air port for receiving the supply of pressurized air, wherein the dryer includes a superheated vapor inlet, a liquid feed inlet, and a vapor and powder outlet, the bag house filter includes a vapor and powder inlet, a powder outlet for expelling dried product therefrom, and a vapor outlet for expelling pressurized, superheated vapor therefrom, the vapor and powder feed inlet fluidly connected to the vapor and powder outlet of the dryer, wherein the dryer includes an enclosure and a drying chamber, the atomizer disposed within the enclosure of the dryer, the atomizer arranged such that the supply of atomized feed slurry is discharged therefrom into the drying chamber, the superheated vapor inlet and the vapor and powder outlet in fluid communication with the drying chamber such that the recirculated mass of superheated vapor circulates through the drying chamber, the enclosure is at a first operating pressure and the drying chamber is at a second operating pressure, the first pressure being greater than the second pressure and wherein the enclosure includes a pressure sensor disposed therein and the drying chamber includes a pressure sensor disposed therein, the pressure sensors operably arranged with a controller, the controller operably arranged with the supply of pressurized air to regulate the pressure in the enclosure to maintain the pressure in the enclosure at a predetermined higher level than the pressure in the drying chamber.

15. The vapor atmosphere spray dryer according to claim 14, wherein the first pressure is greater than the second pressure by between about one-half inch and ten inches of water column.

16. A vapor atmosphere spray dryer comprising:

a closed-loop circuit including a dryer having an enclosure and a drying chamber, a bag house filter system, a fan, and a heater system, the drying chamber of the dryer, the bag house filter, the fan, and the heater system fluidly connected together for circulating a mass of superheated vapor through the closed-loop circuit, the superheated vapor being pressurized to at least 1 psi;

a centrifugal atomizer, the atomizer including a motor, a spindle having a longitudinal axis and a distal end with a distributing wheel, and a body, the spindle being rotatable about the longitudinal axis thereof via the motor, the body having a mounting end and a distal end, the spindle rotatably mounted within the body such that the wheel extends from the distal end of the body, the motor disposed within the enclosure of the drying chamber, the distributing wheel disposed within the drying chamber of the dryer;

a feed system operably arranged with the centrifugal atomizer for providing a supply of atomized feed slurry within the dryer; and a powder discharge system connected to the powder outlet of the bag house filter to receive powder therefrom, the powder discharge system including a holding chamber, an upper, normally-open powder valve, a lower, normally-closed discharge valve, a normally-closed vent valve, and a control unit, the holding chamber including an upper inlet for receiving powder from the powder outlet of the bag house filter, a lower outlet, and a vent port, the normally-open powder valve operable to selectively close the inlet of the holding chamber, the normally-closed discharge valve operable to selectively open the outlet of the holding chamber, the normally-closed vent operable to selectively open the vent port of the holding chamber, the control unit adapted to periodically activate the valves in sequence such that the powder valve is in a closed position to prevent powder from entering the holding chamber, the vent valve is in an open position to allow the vapor to escape from the holding chamber via the vent port to bring the pressure within the holding chamber to atmospheric pressure, and then the discharge valve is in an open position to allow the powder within the holding chamber to discharge therefrom, wherein the dryer includes a superheated vapor inlet, a liquid feed inlet, and a vapor and powder outlet, the bag house filter includes a vapor and powder inlet, a powder outlet for expelling dried product therefrom, and a vapor outlet for expelling pressurized, superheated vapor therefrom, the vapor and powder feed inlet fluidly connected to the vapor and powder outlet of the dryer, the fan is fluidly connected to the vapor outlet of the bag house filter, the fan is fluidly connected to the heating system, and the heating system is fluidly connected to the vapor inlet of the dryer, and wherein the enclosure of the dryer has a first operating pressure, and the drying chamber of the dryer has a second operating pressure, the first operating pressure being greater than the second operating pressure.

* * * * *